United States Patent
Colle et al.

(10) Patent No.: US 10,277,582 B2
(45) Date of Patent: Apr. 30, 2019

(54) APPLICATION SERVICE ARCHITECTURE

(71) Applicant: Microsoft Technology Licensing, LLC, Redmond, WA (US)

(72) Inventors: Olivier Colle, Bellevue, WA (US); William James Staples, Duvall, WA (US); Carlos Aguilar Mares, Redmond, WA (US); Samuel Lenz Banina, Bellevue, WA (US); Karandeep Singh Anand, Redmond, WA (US); Kyle Werner, Seattle, WA (US); Gautam Thapar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

(21) Appl. No.: 14/945,626

(22) Filed: Nov. 19, 2015

(65) Prior Publication Data
US 2017/0063833 A1    Mar. 2, 2017

Related U.S. Application Data

(60) Provisional application No. 62/210,483, filed on Aug. 27, 2015.

(51) Int. Cl.
*H04L 29/06* (2006.01)
*G06F 8/30* (2018.01)
(Continued)

(52) U.S. Cl.
CPC ............ *H04L 63/083* (2013.01); *G06F 8/30* (2013.01); *G06F 8/31* (2013.01); *G06F 8/36* (2013.01); *G06F 8/60* (2013.01); *G06F 21/6218* (2013.01)

(58) Field of Classification Search
CPC .......................................................... G06F 8/30
(Continued)

(56) References Cited

U.S. PATENT DOCUMENTS 5,596,702 A    1/1997  Stucka et al.
5,632,034 A    5/1997  O'Farrell
(Continued)

FOREIGN PATENT DOCUMENTS

DE    102012110802 A1    11/2013
EP        0475581 A2     3/1992
(Continued)

OTHER PUBLICATIONS

Begel, Andrew, "CrystalBoard: A Transparent Shared Whiteboard", Retrieved on: Jul. 9, 2015 Available at: http://research.microsoft.com/en-us/um/people/abegel/cs294/cs294-paper.html.
(Continued)

*Primary Examiner* — Khalil Naghdali
(74) *Attorney, Agent, or Firm* — Dicke, Billig & Czaja, PLLC (57) ABSTRACT

Described herein are various technologies pertaining an extensible, cloud-based service for creating and executing applications (e.g., business or industry-specific workflows). A user knowledgeable about a particular field can utilize a client-hosted design studio or a web-based portal to create an application ("app") (e.g., data transform) relevant to the particular field. The system thus enables users to build mobile applications across platforms without having to write computer code to communicate with backend services such as data sources and/or workflow management systems.

20 Claims, 8 Drawing Sheets

(51) Int. Cl.
    *G06F 21/62*     (2013.01)
    *G06F 8/36*     (2018.01)
    *G06F 8/60*     (2018.01)

(58) Field of Classification Search
    USPC .................................................... 726/9
    See application file for complete search history.

(56) References Cited

U.S. PATENT DOCUMENTS

| | | |
|---|---|---|
| 5,884,083 A | 3/1999 | Royce et al. |
| 6,005,548 A | 12/1999 | Latypov et al. |
| 6,009,410 A | 12/1999 | LeMole et al. |
| 6,061,644 A | 5/2000 | Leis |
| 6,351,843 B1 | 2/2002 | Berkley et al. |
| 6,442,476 B1 | 8/2002 | Poropat |
| 6,536,037 B1 | 3/2003 | Guheen et al. |
| 6,662,199 B1 | 12/2003 | Flight et al. |
| 6,708,329 B1 | 3/2004 | Whitehill et al. |
| 6,820,135 B1 | 11/2004 | Dingman et al. |
| 6,917,963 B1 | 7/2005 | Hipp et al. |
| 6,950,850 B1 | 9/2005 | Leff et al. |
| 6,988,271 B2 | 1/2006 | Hunt |
| 6,993,751 B2 | 1/2006 | Bhansali et al. |
| 7,047,518 B2 | 5/2006 | Little et al. |
| 7,082,576 B2 | 7/2006 | Shahine et al. |
| 7,171,655 B2 | 1/2007 | Gordon et al. |
| 7,251,778 B1 | 7/2007 | Hill et al. |
| 7,269,794 B2 | 9/2007 | Martinez et al. |
| 7,275,241 B2 | 9/2007 | Choi et al. |
| 7,417,644 B2 | 8/2008 | Cooper et al. |
| 7,433,956 B2 | 10/2008 | Zhao et al. |
| 7,458,029 B2 | 11/2008 | Agrawala et al. |
| 7,506,324 B2 | 3/2009 | Thiagarajan et al. |
| 7,509,374 B2 | 3/2009 | Trinh et al. |
| 7,519,959 B1 | 4/2009 | Dmitriev |
| 7,536,635 B2 | 5/2009 | Racovolis et al. |
| 7,539,982 B2 | 5/2009 | Stuart |
| 7,543,269 B2 | 6/2009 | Krueger et al. |
| 7,552,428 B2 | 6/2009 | Stoodley et al. |
| 7,558,748 B2 | 7/2009 | Ehring et al. |
| 7,664,813 B2 | 2/2010 | Pettit et al. |
| 7,698,430 B2 | 4/2010 | Jackson |
| 7,702,729 B2 | 4/2010 | Johanson et al. |
| 7,721,223 B2 | 5/2010 | Ben-Shachar et al. |
| 7,730,446 B2 | 6/2010 | Anonsen et al. |
| 7,765,470 B2 | 7/2010 | Epstein |
| 7,779,429 B2 | 8/2010 | Neil et al. |
| 7,814,171 B2 | 10/2010 | Blegen et al. |
| 7,818,729 B1 | 10/2010 | Plum et al. |
| 7,853,938 B2 | 12/2010 | Melhem et al. |
| 7,908,594 B2 | 3/2011 | Varanasi et al. |
| 7,917,534 B2 | 3/2011 | Demiroski et al. |
| 7,926,029 B1 | 4/2011 | Stoyen et al. |
| 7,930,432 B2 | 4/2011 | Blaszczak |
| 7,937,685 B2 | 5/2011 | Weil et al. |
| 7,954,084 B2 | 5/2011 | Arcaro et al. |
| 7,984,426 B2 | 7/2011 | Loff |
| 7,991,916 B2 | 8/2011 | Meek et al. |
| 8,014,308 B2 | 9/2011 | Gates et al. |
| 8,019,770 B1 | 9/2011 | Hartsook et al. |
| 8,036,140 B2 | 10/2011 | Rao et al. |
| 8,042,094 B2 | 10/2011 | Napoli et al. |
| 8,060,544 B2 | 11/2011 | Werner et al. |
| 8,060,553 B2 | 11/2011 | Mamou et al. |
| 8,060,857 B2 | 11/2011 | Biggerstaff |
| 8,079,023 B2 | 12/2011 | Chen |
| 8,082,517 B2 | 12/2011 | Ben-Shachar et al. |
| 8,085,281 B2 | 12/2011 | Hines et al. |
| 8,161,463 B2 | 4/2012 | Johnson et al. |
| 8,171,398 B2 | 5/2012 | Hosotsubo |
| 8,191,080 B2 | 5/2012 | Goring et al. |
| 8,209,674 B2 | 6/2012 | Meijer et al. |
| 8,214,768 B2 | 7/2012 | Boule et al. |
| 8,214,799 B2 | 7/2012 | Haselden |
| 8,233,887 B2 | 7/2012 | Whitney et al. |
| 8,253,649 B2 | 8/2012 | Imai et al. |
| 8,255,156 B2 | 8/2012 | Ravenscroft et al. |
| 8,255,889 B2 | 8/2012 | Stefansson et al. |
| 8,332,828 B2 | 12/2012 | Vargas |
| 8,365,156 B2 | 1/2013 | Sollich |
| 8,402,379 B2 | 3/2013 | Barak |
| 8,407,605 B2 | 3/2013 | Go et al. |
| 8,438,533 B2 | 5/2013 | Fritzsche et al. |
| 8,456,654 B2 | 6/2013 | Kelly et al. |
| 8,464,208 B2 | 6/2013 | Feigen |
| 8,464,337 B2 | 6/2013 | Mathew et al. |
| 8,479,202 B2 | 7/2013 | Hogan et al. |
| 8,489,474 B2 | 7/2013 | Crook et al. |
| 8,495,580 B2 | 7/2013 | Gowri et al. |
| 8,505,002 B2 | 8/2013 | Yehia et al. |
| 8,516,454 B2 | 8/2013 | Mizrachi et al. |
| 8,527,970 B1 | 9/2013 | Luecke |
| 8,528,000 B2 | 9/2013 | Schumacher et al. |
| 8,531,451 B2 | 9/2013 | Mital et al. |
| 8,533,661 B2 | 9/2013 | Nucci et al. |
| 8,543,972 B2 | 9/2013 | Chen et al. |
| 8,583,413 B2 | 11/2013 | Elaasar |
| 8,600,446 B2 | 12/2013 | Chiang et al. |
| 8,607,206 B2 | 12/2013 | Freeman et al. |
| 8,615,551 B2 | 12/2013 | Balandin et al. |
| 8,635,521 B2 | 1/2014 | Fleishman et al. |
| 8,635,537 B1 | 1/2014 | Kan et al. |
| 8,640,093 B1 | 1/2014 | Gill et al. |
| 8,650,384 B2 | 2/2014 | Lee et al. |
| 8,654,952 B2 | 2/2014 | Wang et al. |
| 8,667,130 B2 | 3/2014 | Shuster |
| 8,669,939 B2 | 3/2014 | Underkoftler et al. |
| 8,689,191 B2 | 4/2014 | Dolby et al. |
| 8,707,278 B2 | 4/2014 | Balakrishnan et al. |
| 8,707,287 B2 | 4/2014 | Raundahl Gregersen et al. |
| 8,779,971 B2 | 7/2014 | Wellington |
| 8,786,517 B2 | 7/2014 | Lewin et al. |
| 8,812,601 B2 | 8/2014 | Hsieh et al. |
| 8,813,028 B2 | 8/2014 | Farooqi |
| 8,832,644 B2 | 9/2014 | Hirsch et al. |
| 8,832,676 B2 | 9/2014 | Mahajan et al. |
| 8,850,045 B2 | 9/2014 | Berg et al. |
| 8,892,850 B2 | 11/2014 | Archer et al. |
| 8,914,733 B2 | 12/2014 | Chai et al. |
| 8,928,582 B2 | 1/2015 | Senanayake et al. |
| 8,954,229 B2 | 2/2015 | Park |
| 8,965,349 B2 | 2/2015 | Kieft et al. |
| 8,990,779 B2 | 3/2015 | Schalk |
| 9,003,010 B1 | 4/2015 | Saparoff |
| 9,003,298 B2 | 4/2015 | Hoke et al. |
| 9,015,659 B2 | 4/2015 | Raundahl Gregersen et al. |
| 9,032,377 B2 | 5/2015 | Mizrachi et al. |
| 9,161,156 B2 * | 10/2015 | Mall ..................... H04L 41/082 |
| 9,424,309 B2 | 8/2016 | Ramachandra et al. |
| 9,459,843 B1 * | 10/2016 | Smith ..................... G06F 8/315 |
| 9,851,968 B2 * | 12/2017 | Straub ..................... G06F 8/71 |
| 2002/0165993 A1 | 11/2002 | Kramer |
| 2002/0169851 A1 | 11/2002 | Weathersby et al. |
| 2003/0229685 A1 | 12/2003 | Twidale et al. |
| 2004/0078760 A1 | 4/2004 | Melhem et al. |
| 2004/0216096 A1 | 10/2004 | Messer et al. |
| 2005/0041784 A1 | 2/2005 | Timmins et al. |
| 2005/0132045 A1 | 6/2005 | Hornback et al. |
| 2005/0138151 A1 | 6/2005 | Lam et al. |
| 2005/0177676 A1 | 8/2005 | Karatal et al. |
| 2005/0251339 A1 | 11/2005 | Araki et al. |
| 2006/0031779 A1 | 2/2006 | Theurer et al. |
| 2006/0089990 A1 | 4/2006 | Ng et al. |
| 2006/0239234 A1 | 10/2006 | Rao et al. |
| 2007/0011008 A1 | 1/2007 | Scarano et al. |
| 2007/0038929 A1 | 2/2007 | Miyazawa |
| 2007/0067440 A1 | 3/2007 | Bhogal et al. |
| 2007/0078953 A1 | 4/2007 | Chai et al. |
| 2007/0174291 A1 | 7/2007 | Cooper et al. |
| 2007/0180362 A1 | 8/2007 | Hunt et al. |
| 2007/0271332 A1 | 11/2007 | Joshi et al. |
| 2007/0288850 A1 | 12/2007 | Fletcher |
| 2007/0294626 A1 | 12/2007 | Fletcher et al. |
| 2008/0072211 A1 | 3/2008 | Rothman et al. |

(56) References Cited

U.S. PATENT DOCUMENTS

| | | |
|---|---|---|
| 2009/0094544 A1 | 4/2009 | Savage |
| 2009/0100178 A1 | 4/2009 | Gonzales et al. |
| 2009/0267780 A1 | 10/2009 | Van Hoff et al. |
| 2010/0058205 A1 | 3/2010 | Vakil et al. |
| 2010/0083212 A1 | 4/2010 | Fritzsche et al. |
| 2010/0083287 A1 | 4/2010 | Maximilien et al. |
| 2010/0131868 A1 | 5/2010 | Chawla et al. |
| 2010/0246571 A1 | 9/2010 | Geppert et al. |
| 2010/0251031 A1 | 9/2010 | Nieh et al. |
| 2010/0306670 A1 | 12/2010 | Quinn et al. |
| 2010/0306738 A1 | 12/2010 | Verma et al. |
| 2010/0312817 A1 | 12/2010 | Steakley |
| 2011/0055309 A1 | 3/2011 | Gibor et al. |
| 2011/0078103 A1 | 3/2011 | Teng et al. |
| 2011/0078560 A1 | 3/2011 | Weeldreyer et al. |
| 2011/0083167 A1 | 4/2011 | Carpenter et al. |
| 2011/0099496 A1 | 4/2011 | Baek et al. |
| 2011/0119576 A1 | 5/2011 | Aumann |
| 2011/0119603 A1 | 5/2011 | Peltz et al. |
| 2011/0154209 A1 | 6/2011 | Fan et al. |
| 2011/0197124 A1 | 8/2011 | Garaventa |
| 2011/0202909 A1 | 8/2011 | Meijer et al. |
| 2011/0228922 A1 | 9/2011 | Dhara et al. |
| 2011/0265003 A1 | 10/2011 | Schubert et al. |
| 2011/0289455 A1 | 11/2011 | Reville et al. |
| 2012/0030632 A1 | 2/2012 | McRae et al. |
| 2012/0036494 A1 | 2/2012 | Gurumohan et al. |
| 2012/0110009 A1 | 5/2012 | Kraft et al. |
| 2012/0144288 A1 | 6/2012 | Caruso et al. |
| 2012/0159472 A1 | 6/2012 | Hong et al. |
| 2012/0185100 A1 | 7/2012 | Strohbach et al. |
| 2012/0197728 A1 | 8/2012 | Luna et al. |
| 2012/0204180 A1 | 8/2012 | Santoli et al. |
| 2013/0047079 A1 | 2/2013 | Kroeger et al. |
| 2013/0055113 A1 | 2/2013 | Chazin et al. |
| 2013/0073614 A1 | 3/2013 | Shine et al. |
| 2013/0111360 A1 | 5/2013 | Kodama et al. |
| 2013/0117715 A1 | 5/2013 | Williams et al. |
| 2013/0178970 A1 | 7/2013 | Cachapa et al. |
| 2013/0212487 A1 | 8/2013 | Cote |
| 2013/0212504 A1 | 8/2013 | Zalewski et al. |
| 2013/0212703 A1 | 8/2013 | Ramesh et al. |
| 2013/0219217 A1 | 8/2013 | Seren et al. |
| 2013/0219263 A1 | 8/2013 | Abrahami |
| 2013/0219303 A1 | 8/2013 | Eriksson et al. |
| 2013/0282532 A1 | 10/2013 | Shihadah et al. |
| 2013/0297696 A1 | 11/2013 | Alexandrov et al. |
| 2013/0311327 A1 | 11/2013 | Tehrani et al. |
| 2014/0007103 A1 | 1/2014 | Nachum et al. |
| 2014/0053126 A1 | 2/2014 | Watson et al. |
| 2014/0089888 A1 | 3/2014 | Bhaskara et al. |
| 2014/0096110 A1 | 4/2014 | Charters et al. |
| 2014/0173683 A1 | 6/2014 | Zhang et al. |
| 2014/0181800 A1 | 6/2014 | Johansson et al. |
| 2014/0201155 A1 | 7/2014 | Vijayan et al. |
| 2014/0215356 A1 | 7/2014 | Brander et al. |
| 2014/0218343 A1 | 8/2014 | Hicks et al. |
| 2014/0223281 A1 | 8/2014 | Bocanegra Alvarez |
| 2014/0229858 A1 | 8/2014 | Bleker et al. |
| 2014/0245140 A1 | 8/2014 | Brown et al. |
| 2014/0250193 A1 | 9/2014 | Goncalves et al. |
| 2014/0280580 A1 | 9/2014 | Langlois et al. |
| 2014/0282106 A1 | 9/2014 | Smith et al. |
| 2014/0289640 A1 | 9/2014 | Poornachandran et al. |
| 2014/0304594 A1 | 10/2014 | Pittenger et al. |
| 2014/0304663 A1 | 10/2014 | Mishra |
| 2014/0304718 A1 | 10/2014 | Gambardella et al. |
| 2014/0306964 A1 | 10/2014 | Reddish et al. |
| 2014/0310619 A1 | 10/2014 | Fickenwirth et al. |
| 2014/0310697 A1 | 10/2014 | Reddish et al. |
| 2014/0337816 A1* | 11/2014 | Chiluvuri ............... G06F 8/36 717/107 |
| 2014/0359478 A1 | 12/2014 | Thakur et al. |
| 2015/0036848 A1 | 2/2015 | Donaldson |
| 2015/0067536 A1 | 3/2015 | Leorin et al. |
| 2015/0070263 A1 | 3/2015 | Murillo et al. |
| 2015/0081684 A1 | 3/2015 | Lewis |
| 2015/0161681 A1* | 6/2015 | Maes ................. G06F 9/546 705/14.72 |
| 2015/0261543 A1 | 9/2015 | Lahteenmaki |
| 2015/0363581 A1 | 12/2015 | Ranadive et al. |
| 2016/0092339 A1* | 3/2016 | Straub ............ G06F 9/44521 717/124 |
| 2016/0094429 A1 | 3/2016 | Richards et al. |
| 2016/0226859 A1* | 8/2016 | Sondhi ................ H04L 63/08 |
| 2016/0241633 A1* | 8/2016 | Overby, Jr. ........ H04L 63/20 |
| 2016/0253722 A1* | 9/2016 | Johnson ......... G06Q 30/0603 |
| 2017/0003862 A1 | 1/2017 | Mital et al. |
| 2017/0003940 A1 | 1/2017 | Mital et al. |
| 2017/0003944 A1 | 1/2017 | Mital et al. |
| 2017/0004021 A1 | 1/2017 | Mital et al. |
| 2017/0004022 A1 | 1/2017 | Mital et al. |
| 2017/0004116 A1 | 1/2017 | Mital et al. |
| 2017/0005897 A1 | 1/2017 | Mital et al. |
| 2017/0005970 A1 | 1/2017 | Mital et al. |
| 2017/0010590 A1 | 1/2017 | Mital et al. |
| 2017/0010673 A1 | 1/2017 | Mital et al. |
| 2017/0010758 A1 | 1/2017 | Mital et al. |
| 2017/0010789 A1 | 1/2017 | Mital et al. |
| 2017/0011011 A1 | 1/2017 | Mital et al. |

FOREIGN PATENT DOCUMENTS

| | | |
|---|---|---|
| EP | 1677239 A1 | 7/2006 |
| EP | 2592506 A2 | 5/2013 |
| WO | 2004013784 A2 | 2/2004 |
| WO | 2008135459 A2 | 11/2008 |
| WO | 2013097896 A1 | 7/2013 |
| WO | 2013182159 A1 | 12/2013 |
| WO | 2014032089 A1 | 3/2014 |
| WO | 2014158128 A1 | 10/2014 |

OTHER PUBLICATIONS

Begole, et al., "Flexible Collaboration Transparency: Supporting Worker Independence in Replicated Application-Sharing Systems", In Journal of ACM Transactions on Computer-Human Interaction, vol. 6, Issue 2, Jun. 1999, pp. 95-132.

Datta, et al., "Proxy-Based Acceleration of Dynamically Generated Content on the World Wide Web: An Approach and Implementation", In Proceedings of ACM SIGMOD International Conference on Management of Data, Jun. 4, 2002, pp. 97-108.

Ai, et al., "Spatial Relation Abstract in Map Generalization Process", In Proceedings of the 9th ACM international symposium on advances in geographic information systems, Nov. 9, 2001, 11 pages.

Fritzsche, et al., "Model Transformation Chains in Model-Driven Performance Engineering: Experiences and Future Research Needs", In Proceedings of Modellierung, Mar. 24, 2010, pp. 213-220, 8 pages.

Fritzsche, et al., "Systematic Usage of Embedded Modelling Languages in Automated Model Transformation chains", In Proceedings of First International Conference Software Language Engineering, Sep. 29, 2008, 4 pages.

Liu, et al., "UI Portals: Sharing Arbitrary Regions of User Interfaces on Traditional and Multi-User Interactive Devices", In Proceedings of 9th International Conference on Ubiquitous Intelligence & Computing and 9th International Conference on Autonomic & Trusted Computing, Sep. 4, 2012, pp. 957-962.

Markarian, et al., "Seamless Interaction Among Heterogeneous Devices in Support for Co-located Collaboration", In Proceedings of the 12th International Conference on Groupware: Design, Implementation, and use, Sep. 6, 2006, 16 pages.

Nimphius, et al., "Building Customizable Oracle ADF Business Applications with Oracle Metadata Services (MDS)", In Oracle White Paper, Jun. 2010, 57 pages.

Qaddoura, Fareed, "Dynamic Website and Data Engine Generators for Distributed Enterprise/Business Architectures", In Thesis, Dec. 2004, 84 pages.

(56) References Cited

OTHER PUBLICATIONS

Richa, et al., "Towards Testing Model Transformation Chains Using Precondition Construction in Algebraic Graph Transformation", In Proceedings of 17th International Conference on Model Driven Engineering Languages & Systems, Sep. 29, 2014, 10 pages.
Schlatter, Tania, "Designing Personalized, Dynamic web Applications with ATG", Published on: Oct. 21, 2002 Available at: http://www.nimblepartners.com/share/atg_design_process.pdf.
Schwabe, et al., "Cohesive Design of Personalized Web Applications", In Journal of IEEE Internet Computing, vol. 6, Issue 2, Mar. 2002, pp. 34-43.
Shi, et al., "Finger Gesture Interaction on Large Tabletop for Sharing Digital Documents Among Multiple Users", In Proceedings of First IEEE International Conference on Ubi-Media Computing, Jul. 31, 2008, pp. 8-13.
Shurtz, S. Richard, "Application Sharing from Mobile Devices with a Collaborative Shared Display", In Thesis and Dissertations Brigham Young University, Jun. 5, 2014, 106 pages.
Sripradha, et al., "Dynamic Resource Management Using Gesture-Based User Interface", In Proceedings of 20th Annual International Conference on Advanced Computing and Communications, Sep. 19, 2014, 6 pages.
Stille, et al., "A2DL—An Adaptive Automatic Display Layout System", In Proceedings of Third Annual Symposium Human on Interaction with Complex Systems, Aug. 25, 1996, pp. 243-250.
Stirbu, Vlad, "A RESTful Architecture for Adaptive and Multi-device Application Sharing", In Proceedings of First International Workshop on RESTful Design, Apr. 26, 2010, 4 pages.
Vanhooff, et al., "Towards a Transformation Chain Modeling Language", In Proceedings 6th International Workshop Embedded Computer Systems: Architectures, Modeling, and Simulation, Jul. 17, 2006, 10 pages.
Vanhooff, et al., "UniTI: A Unified Transformation Infrastructure", In Proceedings of 10th International Conference on Model Driven Engineering Languages and Systems, Sep. 30, 2007, 15 pages.
Wang, et al., "PLA-based Runtime Dynamism in Support of Privacy-Enhanced Web Personalization", In Proceedings of 10th International Software Product Line Conference, Aug. 21, 2006, 10 pages.
Yie, et al., "Realizing Model Transformation Chain Interoperability", In Journal Software and Systems Modeling, Feb. 1, 2012, 21 pages.
Zee, et al., "Application of geographical concepts and spatial technology to the Internet of Things", Retrieved on: Jul. 9, 2015 Available at: http://dspace.ubvu.vu.nl/bitstream/handle/1871/47951/2013-33.pdf?
"Application Transformation", Published on: May 4, 2014, Available at: http://www8.hp.com/us/en/business-solutions/application-transformation-overview.html.
"Configuring the Display of Portal Content", Published on: Jul. 6, 2013 Available at: https://help.sap.com/saphelp_nw73/helpdata/en/3f/4e286c29d3475ca4ebdaedac6f9ede/frameset.htm.
Deploying Multiple-Instance Applications, Retrieved on: Apr. 29, 2015, Available at: https://technet.microsoft.com/en-us/library/cc779351(v=ws.10).aspx.
"Pexpect—Spawn child applications and control them automatically.", Published on: Oct. 21, 2013 Available at: http://www.bx.psu.edu/~nate/pexpect/pexpect.html.
U.S. Appl. No. 14/791,141, Vijay Mital et al., filed Jul. 2, 2015, 91 pages.
"International Search Report and Written Opinion Issued in PCT Application No. PCT/US2016/046091", dated Nov. 30, 2016, 10 Pages.
Vanhoutte, Sam., "Overview of Azure Microservices and the Impact on Integration", Published on: Jan. 27, 2015 Available at: http://www.slideshare.net/biztalk360/overview-of-azure-microservices-and-the-impact-on-integration, 12 pages.
Young, Charles., "Microservices and the Cloud based future of integration final", Published on: Jan. 20, 2015 Available at: http://www.slideshare.net/biztalk360/microservices-and-the-cloud-based-future-of-integration-final?related=1, 12 pages.

Familiar, Bob., "Modern Apps and Microservices", Published on: Jan. 5, 2015 Available at http:://theundocumentedapi.com/2015/01/05/modern-apps-and-microservices/ , 10 pages.
Haddad, Chris., "Why Run Your Microservices on a PaaS", Published on: May 5, 2015 Available at: http://java.dzone.com/articles/why-run-your-microservices , 10 pages.
"Andromo—Make Android apps without coding", Published on: Jul. 12, 2014 Available at: http://www.andromo.com/features, 9 pages.
"Appery.io—Accelerate Mobile Innovation in the Enterprise", Retrieved on: Jun. 4, 2015 Available at: https://appery.io/appbuilder/, 5 pages.
"Igenapps", Retrieved on: Jun. 4, 2015 Available at: http://igenapps.com/#discover , 15 pages.
"Microsoft Project Siena (Beta)", Retrieved on: Jun. 10, 2015 Available at: https://www.microsoft.com/en-us/projectsiena/ , 2 pages.
"Second Written Opinion Issued in PCT Application No. PCT/US2016/046091", dated Jul. 12, 2017, 5 Pages.
"TeamViewer: Manual Team viewer 6.0", Retrieved From <<https://www.teamviewer.com/download/version_6x/teamviewer_manual.pdf>>, Dec. 1, 2010, 102 Pages.
"Non-Final Office Action Issued in U.S. Appl. No. 14/791,141", dated Aug. 29, 2016, 7 Pages.
"Notice of Allowance Issued in U.S. Appl. No. 14/791,141", dated Apr. 25, 2017, 12 Pages.
"Non-Final Office Action Issued in U.S. Appl. No. 14/791,143", dated Aug. 26, 2016, 15 Pages.
"Notice of Allowance Issued in U.S. Appl. No. 14/791,143", dated Dec. 23, 2016, 12 Pages.
"Notice of Allowance Issued in U.S. Appl. No. 14/791,143", dated Apr. 20, 2017, 5 Pages.
"Notice of Allowance Issued in U.S. Appl. No. 14/791,144", dated Feb. 27, 2017, 12 Pages.
"Non-Final Office Action Issued in U.S. Appl. No. 14/791,151", dated Feb. 28, 2017, 10 Pages.
"Final Office Action Issued in U.S. Appl. No. 14/791,153", dated Nov. 8, 2016, 29 Pages.
"Non-Final Office Action Issued in U.S. Appl. No. 14/791,153", dated Jun. 10, 2016, 28 Pages.
"Notice of Allowance Issued in U.S. Appl. No. 14/791,153", dated Apr. 12, 2017, 10 Pages.
"Non-Final Office Action Issued in U.S. Appl. No. 14/791,158", dated Dec. 2, 2016, 8 Pages.
"Non-Final Office Action Issued in U.S. Appl. No. 14/791,161", dated Oct. 17, 2016, 24 Pages.
"Non-Final Office Action Issued in U.S. Appl. No. 14/794,749", dated Jan. 26, 2017, 19 Pages.
Bergstein, Paul L., "Object-Preserving Class Transformations", In SIGPLAN Notices, vol. 26, Issue 11, Nov. 1, 1991, pp. 299-313.
Bhardwaj, et al., "ECC: Edge Cloud Composites", In Proceedings of the 2nd IEEE International Conference on Mobile Cloud Computing, Services, and Engineering, Apr. 8, 2014, 10 Pages.
Etien, et al., "Chaining Model Transformations", In Proceedings of the First Workshop on the Analysis of Model Transformations, Oct. 2, 2012, 6 Pages.
Fei, et al., "A Dataflow-Based Scientific Workflow Composition Framework", In the Proceedings of IEEE Transactions on Services Computing, vol. 5, Issue 1, Jan. 1, 2012, pp. 45-58.
Feinerer, et al., "Class Diagrams with Equated Association Chains", In International Symposium on Theoretical Aspects of Software Engineering (TASE), Jul. 1, 2013, pp. 209-216.
Fujii, et al., "Semantics-based Context-Aware Dynamic Service Composition", In the Journal of ACM Transactions on Autonomous and Adaptive Systems (TAAS), vol. 4, Issue 2, May 1, 2009, pp. 1-31.
Hunold, et al., "Transformation of Legacy Software into Client/Server Applications through Pattern-based Rearchitecturing", In 32nd Annual IEEE International Computer Software and Applications, Jul. 28, 2008, pp. 303-310.
Korkhov, et al., "VLAM-G: Interactive Data Driven Workflow Engine for Grid-Enabled Resources", In Proceedings of Scientific Programming, vol. 15, Issue 3, Oct. 24, 2007, pp. 173-188.

(56) References Cited

OTHER PUBLICATIONS

Lin, et al., "Service-Oriented Architecture for VIEW: A Visual Scientific Workflow Management System", In Proceedings of IEEE International Conference on Services Computing, Jul. 7, 2008, pp. 335-342.
Magalhaes, et al., "A Model Driven Transformation Development Process for Model to Model Transformation", In Proceedings of the 30th Brazilian Symposium on Software Engineering, Sep. 19, 2016, pp. 3-12.
Mcgachey, et al., "Classifying Java Class Transformations for Pervasive Virtualized Access", In ACM Sigplan Notices, vol. 45, Issue 2, Oct. 4, 2009, pp. 75-84.
Nishizawa, et al., "A Small Extension to Java for Class Refinement", In Proceedings of the 2008 ACM Symposium on Applied Computing, Mar. 16, 2008, pp. 160-165.
"International Search Report and Written Opinion Issued in PCT Application No. PCT/US2016/040231", dated Sep. 23, 2016, 11 Pages.
"International Preliminary Report on Patentability Issued in PCT Application No. PCT/US2016/040231", dated Sep. 25, 2017, 7 Pages.
"Second Written Opinion Issued in PCT Application No. PCT/US2016/040231", dated May 22, 2017, 5 Pages.
"International Search Report and Written Opinion Issued in PCT Application No. PCT/US2016/040232", dated Sep. 20, 2016, 12 Pages.
"International Search Report and Written Opinion Issued in PCT Application No. PCT/US2016/040233", dated Sep. 22, 2016, 14 Pages.
"Second Written Opinion Issued in PCT Application No. PCT/US2016/040233", dated Jan. 11, 2017, 10 Pages.
"International Search Report and Written Opinion Issued in PCT Application No. PCT/US2016/040234", dated Sep. 14, 2016, 12 Pages.
"International Search Report and Written Opinion Issued in PCT Application No. PCT/US2016/040235", dated Oct. 10, 2016, 12 Pages.
"International Search Report and Written Opinion Issued in PCT Application No. PCT/US2016/040238", dated Sep. 28, 2016, 11 Pages.
"International Search Report and Written Opinion Issued in PCT Application No. PCT/US2016/040239", dated Oct. 7, 2016, 11 Pages.
"International Search Report and Written Opinion Issued in PCT Application No. PCT/US2016/040240", dated Oct. 13, 2016, 13 Pages.
"Second Written Opinion Issued in PCT Application No. PCT/US2016/040240", dated Apr. 20, 2017, 7 Pages.
"International Search Report and Written Opinion Issued in PCT Application No. PCT/US2016/040595", dated Oct. 13, 2016, 14 Pages.
"Second Written Opinion Issued in PCT Application No. PCT/US2016/040595", dated May 3, 2017, 4 Pages.
"International Preliminary Report on Patentability Issued in PCT Application No. PCT/US2016/041211", dated May 15, 2017, 8 Pages.
"International Search Report and Written Opinion Issued in PCT Application No. PCT/US2016/041211", dated Sep. 13, 2016, 11 Pages.
"International Search Report and Written Opinion Issued in PCT Application No. PCT/US2016/041212", dated Sep. 19, 2016, 11 Pages.
"Second Written Opinion Issued in PCT Application No. PCT/US2016/041212", dated Jun. 6, 2017, 8 Pages.
"International Search Report and Written Opinion Issued in PCT Application No. PCT/US2016/041213", dated Oct. 11, 2016, 10 Pages.
"Second Written Opinion Issued in PCT Application No. PCT/US2016/041213", dated May 29, 2017, 5 Pages.
"International Search Report & Written Opinion Issued in PCT Patent Application No. PCT/US2016/041214", dated Oct. 12, 2016, 13 Pages.
"International Search Report and Written Opinion Issued in PCT Application No. PCT/US2016/041215", dated Oct. 13, 2016, 14 Pages.
"Second Written Opinion Issued in PCT Application No. PCT/US2016/041215", dated Mar. 16, 2017, 9 Pages.
Pering, et al., "Enabling Pervasive Collaboration with Platform Composition", In International Conference of Pervasive Computing, May 11, 2009, pp. 184-201.
Pierre, et al., "Ubiquitous Widgets: Designing Interactions Architecture for Adaptive Mobile Applications", In Proceedings of the Distributed Computing in Sensor Systems (DCOSS), 2013 IEEE International Conference Held on May 20, 2013, May 20, 2013, 5 Pages.
Troche, Hugo, "Refactoring with Eclipse: Eclipse Provides a Collection of Refactoring Features", In Dr Dobb's Journal-Software Tools for the Professional Programmer, Oct. 1, 2004, 10 Pages.
Vignaga, et al., "Transforming System Operations' Interactions into a Design Class Diagram", In Proceedings of the 2007 ACM Symposium on Applied Computing, Mar. 11, 2007, pp. 993-997.
Weidendorfer, et al., "Performance Optimization by Dynamic Code Transformation", In Proceedings of the 8th ACM International Conference on Computing Frontiers, May 3, 2011, 2 Pages.
Yu, et al., "A Feature-Driven Approach to Automated Class Diagram Construction", In Proceedings of the 7th Asia-Pacific Symposium on Internetware, Nov. 6, 2015, pp. 1-9.
Zhang, et al., "CloudWF: A Computational Workflow System for Clouds Based on Hadoop", In the Proceedings Cloud Computing, vol. 5931, Dec. 2009, pp. 393-404.
"International Preliminary Report on Patentability Issued in PCT Application No. PCT/US2016/046091", dated Nov. 28, 2017, 6 Pages.

\* cited by examiner

APPLICATION SERVICE ARCHITECTURE

CROSS REFERENCE TO RELATED APPLICATION

This application claims the benefit of U.S. Provisional Application No. 62/210,483, filed Aug. 27, 2015, entitled "Application Service Architecture", which application is incorporated herein in its entirety.

BACKGROUND

Development of industry-specific computer applications has conventionally required computer programming skills and knowledge of resources such as data sources and available services. For example, in order to create an application to retrieve information from a database, the developer would need to know the name of the database, where the database is stored, how data is organized in the database and commands to retrieve information from the database. These programming skills are generally beyond the scope of skill encompassed by non-technical users.

SUMMARY

Described herein is a system comprising a resource provider configured to, in response to a request to create an application, identify an authorized microservice, provide information regarding the identified authorized microservice, and, in response to selection of the microservice provide real-time data associated with the microservice. The resource provider is further configured to store information regarding the selected microservice and metadata describing the selected microservice as the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to a cloud-based service for creating and executing applications are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding creation of cloud-based industry-specific applications utilizing microservice(s) such that a user can create applications without writing code and without knowledge of how function(s) are performed by the microservice(s). What follows are one or more exemplary systems and methods.

Aspects of the subject disclosure pertain to the technical problem of creating industry specific applications. The technical features associated with addressing this problem involve building mobile applications across platforms without having to write computer code to communicate with backend services such as data sources and/or workflow management systems. Accordingly, aspects of these technical features exhibit technical effects with respect to facilitating creation and/or use of cloud-based industry-specific applications utilizing microservice(s) without writing code and without knowledge of how function(s) are performed by the microservice(s), thereby increasing productivity and reducing user frustration in application creation.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

An application composition and deployment system as described herein can be an extensible, cloud-based service for creating and executing applications (e.g., business or industry-specific workflows). A user knowledgeable about a particular field can utilize a client-hosted design studio or a web-based portal to create an application ("app") (e.g., to transform data) relevant to the particular field. The system thus enables users to build mobile applications across platforms without having to worry about writing computer code to communicate with backend services such as data sources and/or workflow management systems.

During creation of the app, the user is presented with real-time live access to data source(s) and is able to create the app without writing code or having knowledge of how function(s) are performed by the microservice(s). Once created, the app can be published to a cloud-based storage system and be made available for the user and, optionally, other(s) to deploy.

Figure 1:
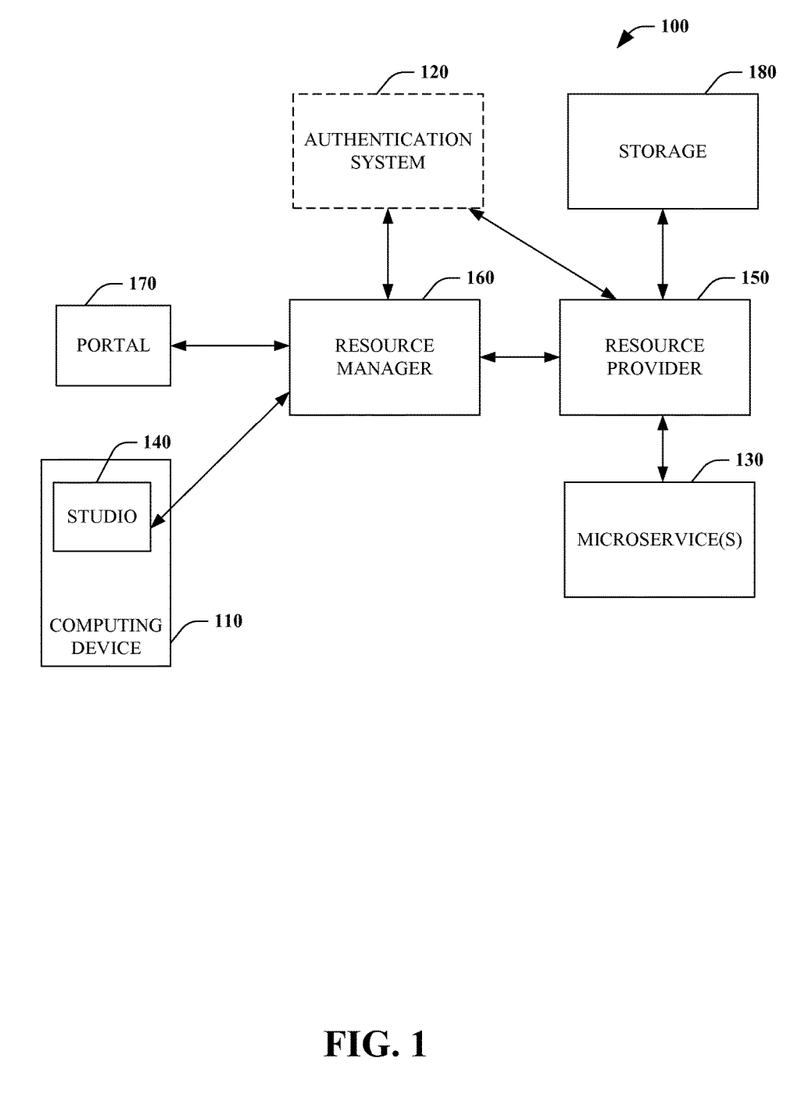
FIG. 1 illustrates an exemplary system for creating applications.

With reference now to FIG. 1, a system 100 for creating applications in accordance with aspects of the subject matter described herein. All or portions of system 100 may reside on one or more computers or computing devices such as the computers described below with respect to FIG. 8.

The components illustrated in FIG. 1 are exemplary and are not meant to be all-inclusive of components that may be needed or included. Furthermore, the number of components may differ in other embodiments without departing from the spirit or scope of aspects of the subject matter described herein. In some embodiments, the components described in conjunction with FIG. 1 may be included in other components (shown or not shown) or placed in subcomponents without departing from the spirit or scope of aspects of the subject matter described herein. In some embodiments, the components and/or functions described in conjunction with FIG. 1 may be distributed across multiple devices.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. Services such as Software as a Service ("SaaS") and Platform as a Service ("PaaS") may be available via the cloud computing environment.

System 100 can include one or more computing devices such as, for example, computing device 110. Contemplated computing devices include but are not limited to desktop computers, tablet computers, laptop computers, notebook computers, personal digital assistants, smart phones, cellular telephones, mobile telephones, and so on. A computing device can include one or more processors and a memory such as memory that communicates with the one or more processors.

System 100 can, optionally, include an authentication system 120 that provides a token in response to successful authentication of credential(s) associated with the computing device 110 and/or a user of the computing device 110. "Token" includes various configurations of information and data used to realize a right to access particular data, service(s) and/or resource(s). For example, the token can be time-based thus allowing for temporally limited access to data (e.g., expiration of token).

In one exemplary embodiment, the authentication system 120 provides role-based access control utilizing a JavaScript Object Notation (JSON) web token. An example of such an authentication system is Microsoft Corporation's Azure Active Directory®. JSON is a lightweight computer data interchange format. It is a text-based, human-readable format for representing simple data structures and associative arrays, called objects. The JSON format is specified in RFC 4627.

The JSON format is often used for transmitting structured data over a network connection in a process called serialization. JSON is sometimes used as an alternative to the use of the XML format. JSON's basic types are: Number (integer, real, or floating point), String (double-quoted Unicode with backslash escapement), Boolean (true and false), Array (an ordered sequence of values, comma-separated and enclosed in square brackets), Object (collection of key/value pairs, comma-separated and enclosed in curly brackets) and null.

The token can be utilized to discover data, service(s), microservice(s) 130 and/or resource(s) to which a computing device 110 and/or a user of the computer device 110 are authorized. "Microservice" refers to a unit of functionality that may or may not be dependent on other microservice(s) or service(s). Microservice(s) 130 are generally authored by information technology professional such as computer programmers skilled in computer programming and having knowledge of complex functionality involved in accessing cloud-based resource(s). In one exemplary embodiment, a microservice 130 is programmed to integrate with a particular service (e.g., Office365) and provides Application Programming Interfaces (APIs) for an app to communicate with the particular service. In another exemplary embodiment, a particular microservice 130 is programmed to be a free-standing service of itself—that is, it does not serve as a connector to a service.

The computing device 110 can include a studio 140 that is an application running on the computing device 110 that facilitates communication with a resource provider 150 through a resource manager 160 to create, deploy and/or modify an app. Request(s) sent from the studio 140 can include the token provided by the authentication system 120 which the resource manager 160 can validate. If the token is validated, the resource manager can forward the request on to the resource provider 150.

The system 100 can further include a portal 170 which provides web-based access to the resource provider 150 similar in function to the studio 140 of the computing device 110. The portal 170 can facilitate communication with the resource provider 150 through the resource manager 160 to create, deploy and/or modify an app. Again, request(s) sent from the portal 170 can include the token provided by the authentication system 120. If the token is validated, the resource manager 160 can forward the request on to the resource provider 150.

A particular provider (e.g., cloud-based) can store resource(s) for a plurality of entities, with each entity limiting access to particular user(s) and/or computing device(s). As noted above, the token can provide role-based access to the cloud-based resource(s). Thus, the resource provider 150 can identify cloud-based resource(s) such as data source(s), microservice(s) 130, APIs and/or service(s) available to a particular user and/or computing device 110 based upon the token presented.

In one exemplary embodiment, communications with the resource provider 150 can take place according to any suitable Representational State Transfer (REST) based APIs, such as Hypertext Transfer Protocol (HTTP), Simple Object Access Protocol (SOAP), etc. REST APIs enable separation of clients from servers such that servers are not generally concerned with user interface or user states. Further, servers and client can be replaced and developed independently with an unaltered interface between them. REST APIs further enable a stateless protocol where no client context is stored on the server between requests. That is, each request from a client contains the information necessary to service the request and any session state is held in the client. Systems that follow REST principles are often referred to as "RESTful." In this regard, in one aspect, embodiments advantageously use standardized REST based APIs to communicate.

The resource provider 150 can identify the authorized cloud-based resource(s) such as microservice(s) 130 that the user and/or computing device 110 are authorized to utilize. The microservice(s) 130 can be represented as icon(s) within a gallery selection portion of a user interface presented via the studio 140 and/or portal 170.

The resource provider 150 can receive information regarding selection by the user of one or more of the microservice(s) 130 for which the user is authorized. For example, the user can select one or more microservice(s) 130 by touching a computer display, using a mouse to drag and drop an icon representing the microservice(s) or any other manner suitable for providing information regarding selection of one or more microservice(s) 130.

In response to the selection information, in one exemplary embodiment, the resource provider 150 can provision the selected resource(s) and provide information regarding real-time data associated with the one or more selected microservice(s) 130. For example, in response to selection of a microservice(s) 1300 associated with a data source, the resource provider 150 can provide information regarding a schema of the data source (e.g., row(s), column(s), tag(s) and/or other identifier(s) of information). Further selection can result in the resource provider 150 providing information regarding real-time data associated with a field of data within the schema. Instead of a conventional iterative design experience of creating an application in a design environment (i.e., which generally involves writing code), and then executing the app in a runtime environment, by providing real-time data, the user can experience a user interface of executing the app while the app is being developed.

In addition to selecting microservice(s) 130, the user can provide logic for transforming data, visual(s) and workflow management within the app. Once the user has created the app, the app can be deployed (e.g., packaged) and stored in storage 180 within the cloud-based computing environment for subsequent usage. The resource provider 150 can further store metadata describing microservice(s) 130 consumed by the app. In one exemplary embodiment, the resource provider 150 stores the app as a package such as a zip file comprising HyperText Markup Language (HTML) and/or JavaScript, a "compiled" application and a list of microservice reference(s) used by the app.

In one exemplary embodiment, when an app is stored, the user can specify attribute(s) associated with sharing of the app. For example, the user can specify that the app can be shared with specific user(s) and/or user(s) having specific role(s). Further, the user can specify that the app is not to be shared with any other user(s). Additionally, in one example, the user can specific that other specific user(s) can "execute" the app and/or "execute and edit" the app. In one exemplary embodiment, the system 100 can allow for sharing of apps across a tenant boundary. Additional attribute(s) can be associated with the user's role, for example, owner, contributor and/or reader.

Further, sharing of apps can be controlled by a policy associated with the tenant. For example, a policy associated with the tenant can prohibit sharing of apps across a tenant data boundary. In this example, the user would not be permitted by the resource provider 150 to share the app across a tenant boundary (e.g., with an employee of a different tenant of the cloud-based provider).

Through the sharing of apps, users can collaborate on projects. Further, in one exemplary embodiment, apps stored by the resource provider 150 can support versioning. In this manner, the user or other user(s) can save modifications to an app as a new version without destroying the original app.

Figure 2:
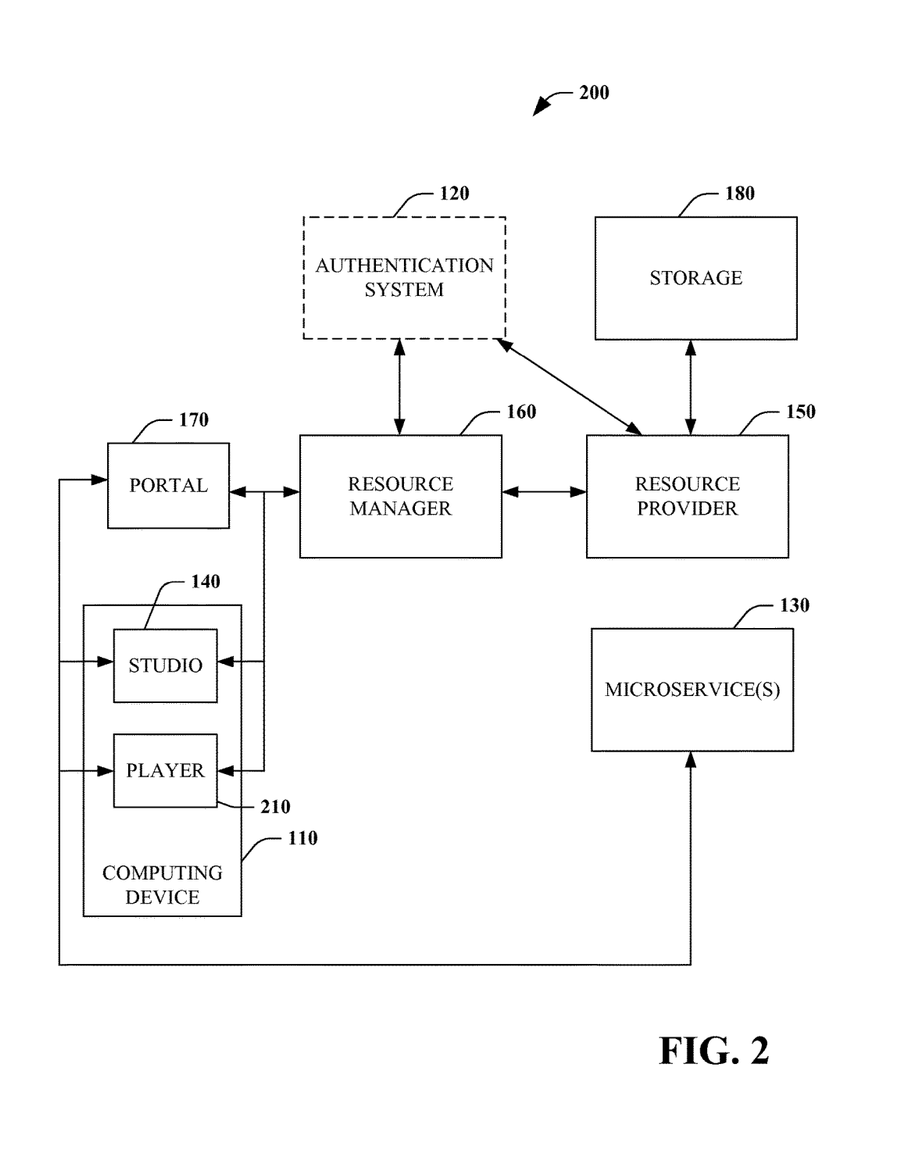
FIG. 2 illustrates an exemplary system for identifying and executing applications.

Turning to FIG. 2, a system 200 for identifying and executing applications in accordance with aspects of the subject matter described herein. All or portions of system 200 may reside on one or more computers or computing devices such as the computers described below with respect to FIG. 8.

The stored app can be made available to the user and/or other user(s) via the studio 140, the portal 170 and/or a player 210. The player 210 is a component (e.g., native mobile application) executing within the computing device 110 that communicates with the resource provider 150. Different players 210 can be provided for different devices and platforms.

System 200 can, optionally, include an authentication system 120 that provides a token in response to successful authentication of credential(s) associated with the computing device 110 and/or a user of the computing device 110. Upon successful authentication through the resource manager 160 and authentication system 120, information stored in the storage 180 can be provided to a user via the studio 140, portal 170 and/or the player 210. The information provided to the user can be based upon the token presented with a request for information. That is, the user can be presented with information regarding stored apps which the user is authorized to use. The user can be presented with information regarding apps created by the user and/or apps created by others and shared with the user.

Based upon, for example, sharing attributes and/or policies, the resource provider 150 can provide information regarding app(s) (e.g., a list) for which the user is authorized to utilize. In one exemplary embodiment, information can be displayed to the user in a gallery of apps accessible via the resource provider 150 (e.g., app(s) stored in storage 180).

Upon selection of a particular app by the user, through the resource manager 160, the resource provider 150 can provide a package of the particular app to the user (e.g., via portal 170, studio 140 and/or player 210). In one exemplary embodiment, the resource provider 150 provides the app as a package such as a zip file comprising HTML and JavaScript to the portal 170, studio 140 and/or player 210.

In one exemplary embodiment, when running the particular app, the portal 170, studio 140 and/or player 210 make calls directly to the microservice(s) 130. In this embodiment, the calls do not go through the resource manager 160 or the resource provider 150.

Further, a saved app can be utilized by the user and/or other user(s) (e.g., based on specified sharing attribute(s)) as a template to build a new app, as set forth above with respect to FIG. 1. Additionally, the portal 170, studio 140 and/or player 210 can be used by the user to manage apps via the resource source manager 160 and the resource provider 150. For example, the resource provider 150 can identify apps created by the user (e.g., MyApps). The user can modify (e.g., modify sharing attributes) and/or delete apps, as desired. The user can further identify pre-made apps to install and/or modify.

Figure 3:
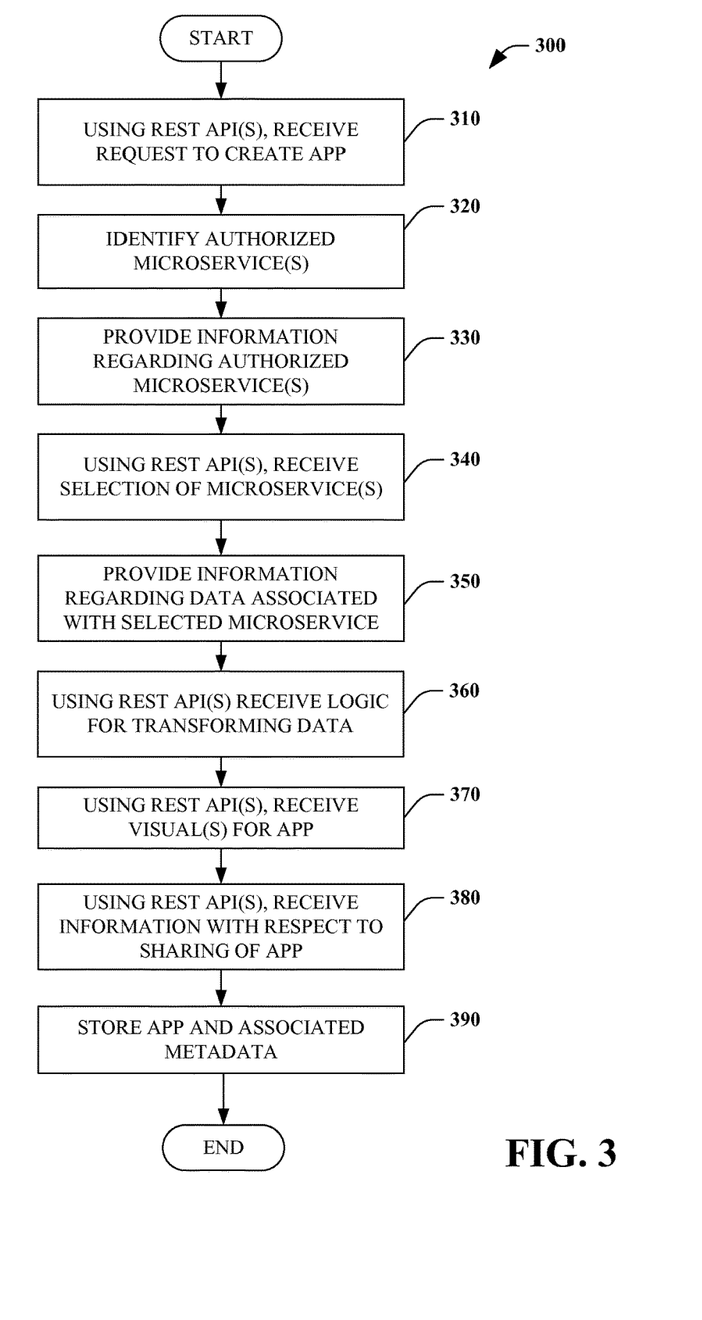
FIG. 3 is a flow diagram that illustrates an exemplary methodology of creating an application.
Figure 4:
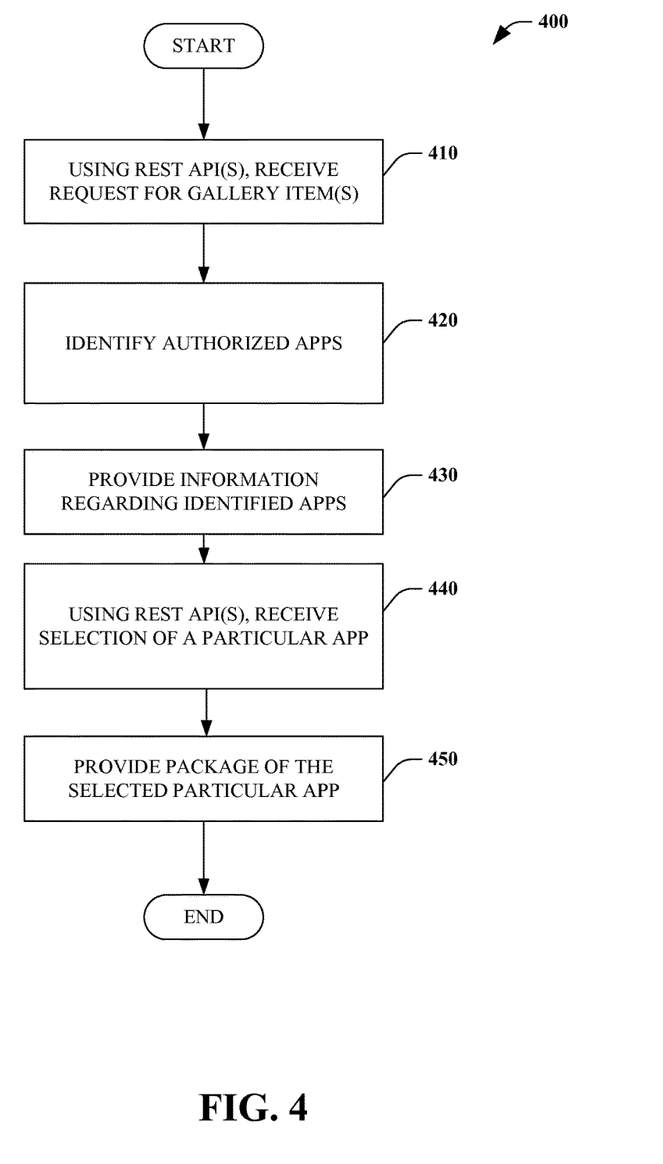
FIG. 4 is a flow diagram that illustrates an exemplary methodology of identifying and providing an application is illustrated.
Figure 5:
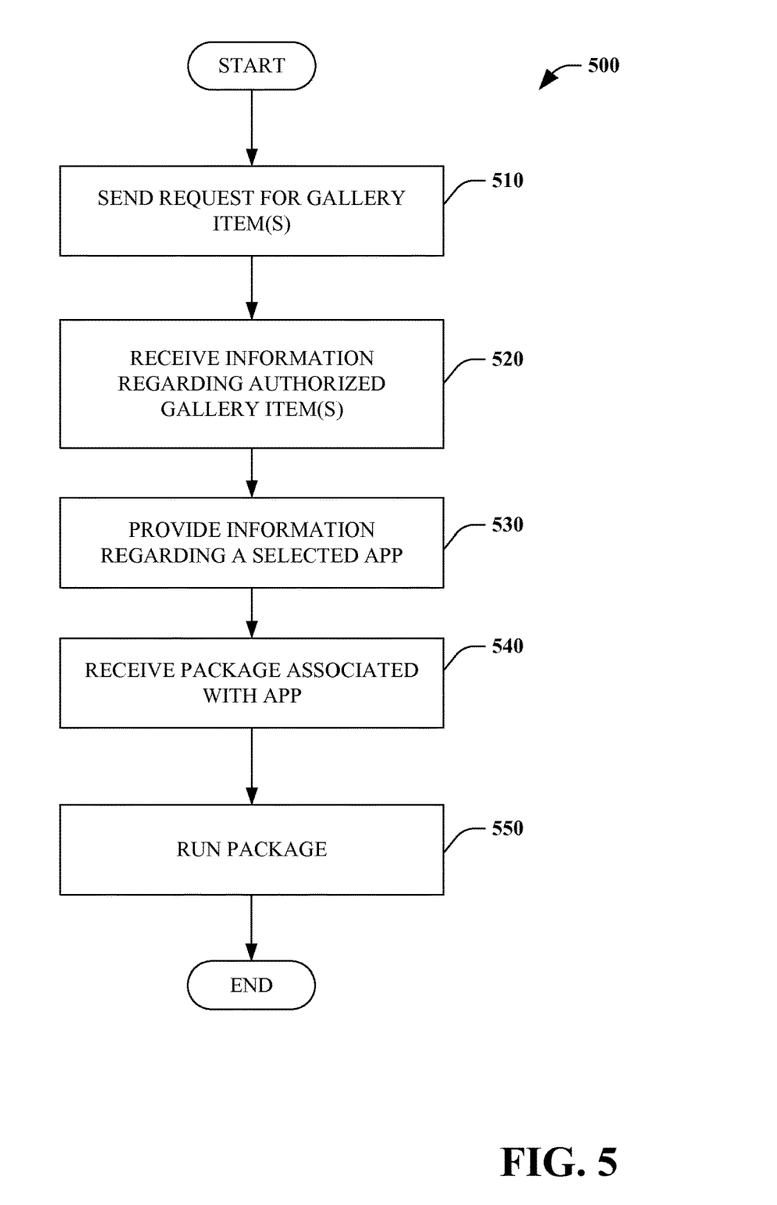
FIG. 5 is a flow diagram that illustrates an exemplary methodology of identifying and running an application is illustrated.

FIGS. 3-5 illustrate exemplary methodologies relating to creation, deploying, identifying and executing applications. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 3, an exemplary methodology 300 of creating an application ("app") is illustrated. At 310, a request to create an app is received using REST API(s), for example, of the resource provider 150 through the resource manager 160. Prior to the request being forwarded to the resource provider 150, the resource manager 160 can authenticate a user and/or computing device 110 initiating the request and obtain authorization information (e.g., a token) associated with the user and/or computing device 110.

At 320, authorized microservice(s) 130 can be identified, for example, by the resource provider 150 based on the token. At 330, information regarding the authorized microservice(s) 130 can be provided (e.g., to a user via the studio 140 and/or portal 170).

Next, at 340, selection of microservice(s) 130 can be received using REST API(s) of the resource provider 150. At 350, information regarding data associated with the selected microservice 130 can be provided, for example, to the user. For example, the data can be real-time data associated with a particular data source.

At 360, logic for transforming data is received using REST API(s) of the resource provider 150. At 370, visual(s) for the app are received using REST API(s) of the resource provider 150. At 380, information regarding sharing of app is received using REST API(s) of the resource provider 150. For example, the information can indicate that the app is not to be shared, that the app is to be shared with specific user(s) and/or that the app is to be made public (e.g., available to any user of a specified data environment). Finally, at 390, the app and associated metadata are stored, for example, in storage 180.

Next, referring to FIG. 4, an exemplary methodology 400 of identifying and providing an application ("app") is illustrated. At 410, a request for gallery item(s) is received using REST API(s) of the resource provider 150. Prior to the request being forwarded to the resource provider 150, the resource manager 160 can authenticate a user and/or computing device 110 initiating the request and obtain authorization information (e.g., a token) associated with the user and/or computing device 110.

At 420, authorized apps of the user/computing device 110 are identified by the resource provider 150, for example, based upon the token. At 430, information regarding the identified apps is provided, for example, at the user via the portal 170, the studio 140 and/or the player 210.

At 440, using REST API(s), selection of a particular app is received by the resource provider 150. At 450, the resource provider 150 provides a package (e.g., ZIP file) of the selected particular app.

Next, FIG. 5 illustrates an exemplary methodology 500 of identifying and running an application. For example, the methodology 500 can be implemented by the portal 170, the studio 140 and/or the player 210.

At 510, a request for gallery item(s) (e.g., apps) is sent. The request can include a token received from an authentication system 120, as discussed above. The request can be received by the resource manager 160 and forward to the resource provider 150.

At 520, information regarding authorized gallery item(s) (e.g., apps) can be received. At 530, selection information regarding an app can be provided (e.g., based upon user input). At 540, a package associated with the app is received. At 550, the package associated with the app is run. For example, the portal 170, the studio 140 and/or the player 210 can communicate directly with microservice(s) 130 during running of the app.

Figure 6:
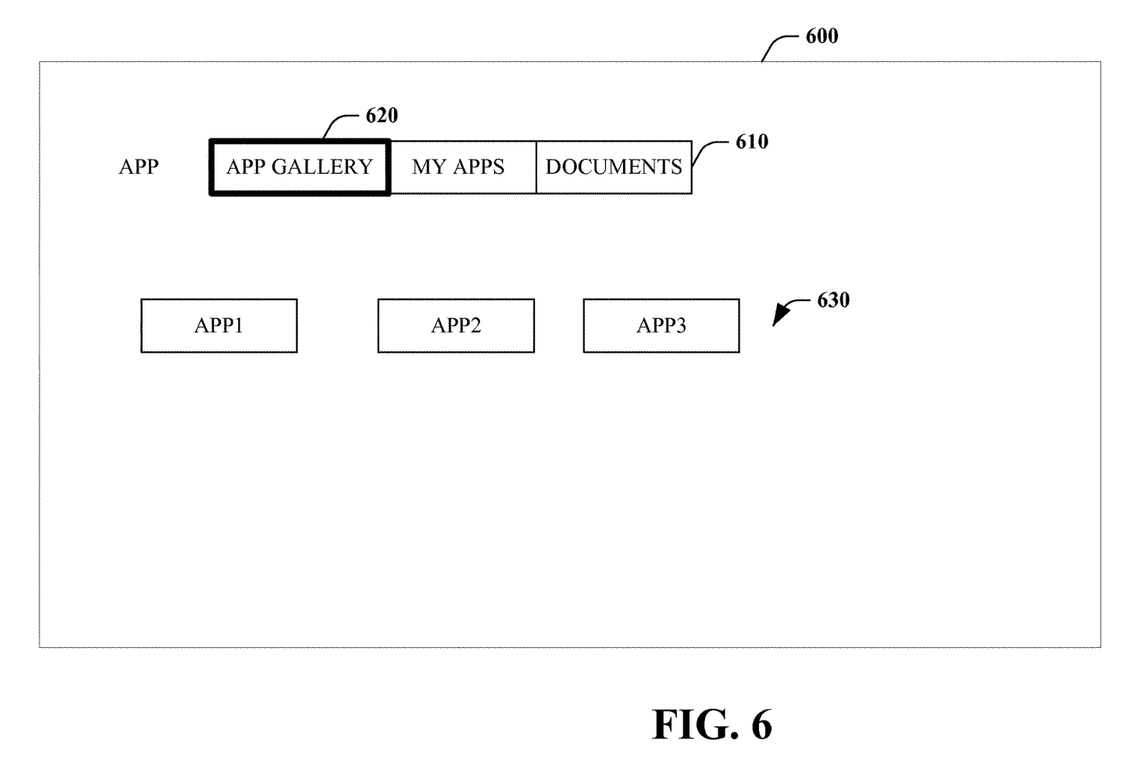
FIG. 6 is an exemplary user interface of an exemplary embodiment.

Next, FIG. 6, an exemplary user interface 600 of an exemplary embodiment is illustrated. The user interface 600 includes a selection gallery 610 for selecting one of a plurality of gallery items. In the example user interface 600, item 620 "App Gallery" has been selected and corresponding apps 630 "APP1", "APP2" "APP3" are presented. The apps 630 are presented to the user based upon a token provided to the resource provider 150 which identified the three apps "APP1", "APP2" and "APP3" as authorized for the user. Selection of one of these applications can cause the resource provider 150 to provide a package associated with the selected application to be provided, for example, to the portal 170, the studio 140 and/or the player 210.

Three applications are illustrated in the user interface 600 for purposes of explanation only. Those skilled in the art will recognize that zero, one or a plurality of applications can be displayed based, for example, upon user authorization and/or user preferences.

Figure 7:
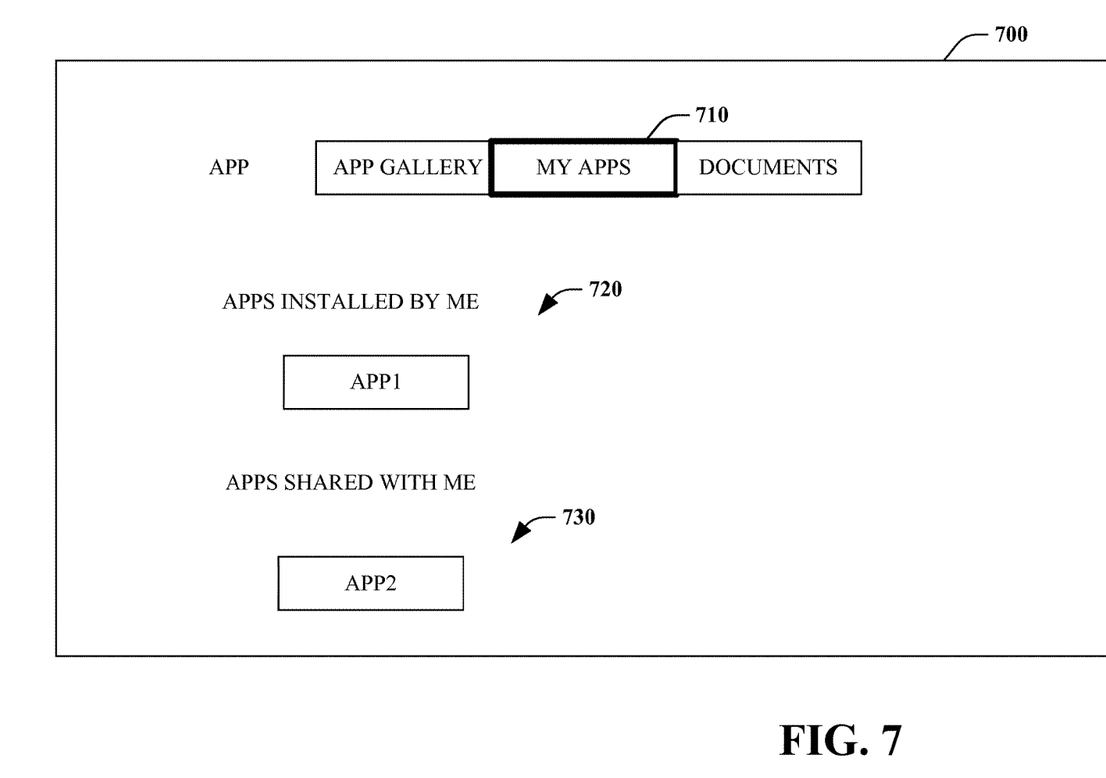
FIG. 7 is an exemplary user interface of an exemplary embodiment.

Referring to FIG. 7, an exemplary user interface 700 of an exemplary embodiment is illustrated. The user interface 700 includes a selection gallery 710 for selecting one of a plurality of gallery items. In the example user interface 700, item 710 "MY APPS" has been selected and app groupings "Apps installed by me" 720 and "Apps shared with me" 730 are presented.

Selection of one of the applications can cause the resource provider 150 to provide a package associated with the selected application to be provided, for example, to the portal 170, the studio 140 and/or the player 210.

One application is illustrated in each of the groupings of user interface 700 for purposes of explanation only. Those skilled in the art will recognize that zero, one or a plurality of applications can be displayed based, for example, upon user authorization and/or user preferences.

Described herein is a system including a processor and a memory, the memory including a resource provider configured to, in response to a request to create an application, identify an authorized microservice, provide information regarding the identified authorized microservice, and, in response to selection of the microservice provides real-time data associated with microservice, the resource provider further configured to store information regarding the selected microservice and metadata describing the selected microservice as the application. The system can include wherein the authorized microservice is cloud-based. The system can include wherein communication with the resource provider is based upon a Representational State Transfer based Application Programming Interface. The system can include wherein the Application Programming Interface is based on Hypertext Transfer Protocol (HTTP). The system can include wherein the Application Programming Interface is based on Simple Object Access Protocol (SOAP). The system can include wherein the microservice is identified as authorized based upon a token presented in the request. The system can include wherein the token is a role-based access control web token utilizing a JavaScript Object Notation (JSON). The system can include the application is created without a user writing code. The system can include wherein the metadata further comprises a sharing attribute indicative of whether the application can be shared or not. The system can include wherein the sharing attribute is further indicative of whether the application can be shared across a tenant boundary with a different tenant of a cloud-based provider.

Described is a method in which is information regarding one or more microservices for which a user is authorized is provided, using a Representational State Transfer based Application Programming Interface, information regarding selection by the user of one or more of the microservices for which the user is authorized is received, information regarding data associated with the one or more selected microservices is provided, and information regarding the one or more selected microservices as an application along with metadata describing the one or more selected microservices is stored. The method can include wherein the data is real-time data associated with a particular data source. The method can further include authenticating the user, the user having role-based access authorized control to the one or more microservices. The method can further include using a Representational State Transfer based Application Programming Interface, logic for transforming data for the application is received. The method can further include using a Representational State Transfer based Application Programming Interface, a visual for the application is received. The method can further include using a Representational State Transfer based Application Programming Interface, information regarding sharing of the application is received.

Described is a method in which using a Representational State Transfer based Application Programming Interface, a request for gallery items is received, authorized applications associated with the request are identified, information regarding the identified applications is provided, using a Representational State Transfer based Application Programming Interface, selection of a particular application of the identified applications is received, and a package of the selected particular application is provided. The method can include wherein the package is a file comprising HyperText Markup Language. The method can include wherein the package is a file comprising JavaScript. The method can include wherein identifying authorized applications associated with the request is based on a token received with the request.

Figure 8:
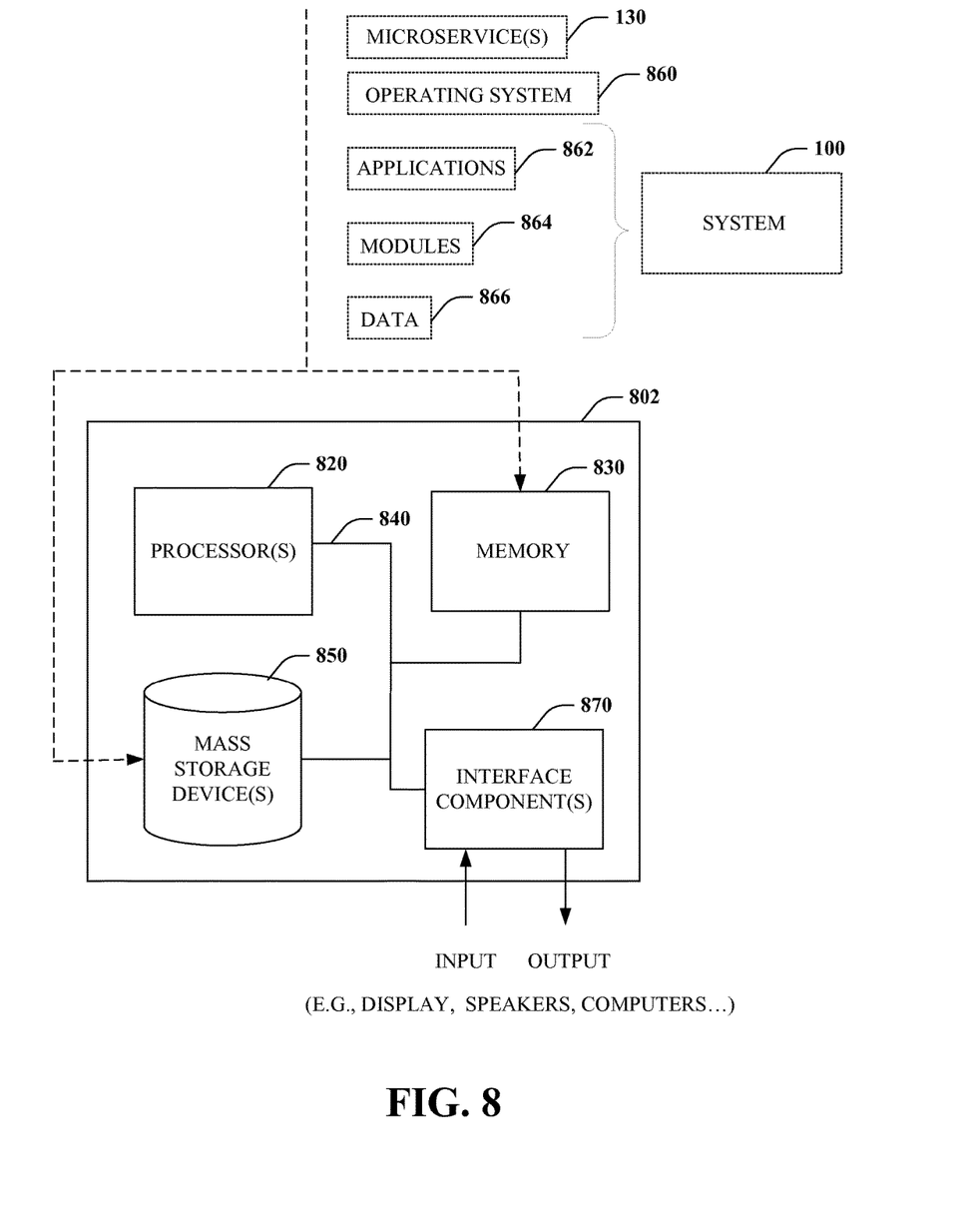
FIG. 8 is an exemplary computing system.

With reference to FIG. 8, illustrated is an example general-purpose computer or computing device 802 (e.g., desktop, laptop, tablet, watch, server, hand-held, programmable consumer or industrial electronics, set-top box, game system, compute node . . . ). The computer 802 includes one or more processor(s) 820, memory 830, system bus 840, mass storage device(s) 850, and one or more interface components 870. The system bus 840 communicatively couples at least the above system constituents. However, it is to be appreciated that in its simplest form the computer 802 can include one or more processors 820 coupled to memory 830 that execute various computer executable actions, instructions, and or components stored in memory 830.

The processor(s) 820 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 820 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 820 can be a graphics processor.

The computer 802 can include or otherwise interact with a variety of computer-readable media to facilitate control of the computer 802 to implement one or more aspects of the claimed subject matter. The computer-readable media can be any available media that can be accessed by the computer 802 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computer 802. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 830 and mass storage device(s) 850 are examples of computer-readable storage media. Depending on the exact configuration and type of computing device, memory 830 may be volatile (e.g., RAM), non-volatile (e.g., ROM, flash memory . . . ) or some combination of the two. By way of example, the basic input/output system (BIOS), including basic routines to transfer information between elements within the computer 802, such as during start-up, can be stored in nonvolatile memory, while volatile memory can act as external cache memory to facilitate processing by the processor(s) 820, among other things.

Mass storage device(s) 850 includes removable/non-removable, volatile/non-volatile computer storage media for storage of large amounts of data relative to the memory 830. For example, mass storage device(s) 850 includes, but is not limited to, one or more devices such as a magnetic or optical disk drive, floppy disk drive, flash memory, solid-state drive, or memory stick.

Memory 830 and mass storage device(s) 850 can include, or have stored therein, operating system 860, one or more applications 862, one or more program modules 864, data 866, and microservice(s) 130. The operating system 860 acts to control and allocate resources of the computer 802. Applications 862 include one or both of system and application software and can exploit management of resources by the operating system 860 through program modules 864 and data 866 stored in memory 830 and/or mass storage device (s) 850 to perform one or more actions. Accordingly, applications 862 can turn a general-purpose computer 802 into a specialized machine in accordance with the logic provided thereby. In one example, applications 826 includes resource manager 160 and/or portal 170.

All or portions of the claimed subject matter can be implemented using standard programming and/or engineering techniques to produce software, firmware, hardware, or any combination thereof to control a computer to realize the disclosed functionality. By way of example and not limitation, the system 100 or portions thereof, can be, or form part, of an application 862, and include one or more modules 864 and data 866 stored in memory and/or mass storage device(s) 850 whose functionality can be realized when executed by one or more processor(s) 820.

In accordance with one particular embodiment, the processor(s) 820 can correspond to a system on a chip (SOC) or like architecture including, or in other words integrating, both hardware and software on a single integrated circuit substrate. Here, the processor(s) 820 can include one or more processors as well as memory at least similar to processor(s) 820 and memory 830, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in an SOC architecture.

The computer 802 also includes one or more interface components 870 that are communicatively coupled to the system bus 840 and facilitate interaction with the computer 802. By way of example, the interface component 870 can be a port (e.g., serial, parallel, PCMCIA, USB, FireWire . . . ) or an interface card (e.g., sound, video . . . ) or the like. In one example implementation, the interface component 870 can be embodied as a user input/output interface to enable a user to enter commands and information into the computer 802, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 870 can be embodied as an output peripheral interface to supply output to displays (e.g., LCD, LED, plasma . . . ), speakers, printers, and/or other computers, among other things. Still further yet, the interface component 870 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   a processor; and
   a memory comprising:
   a resource provider configured to, in response to a request to create an application, identify an identified authorized microservice, provide information regarding the identified authorized microservice, and, in response to selection of a selected authorized microservice provide real-time data associated with the selected authorized microservice, the resource provider further configured to store information regarding the selected authorized microservice and metadata describing the selected authorized microservice as the application, the selected authorized microservice associated with a data source, the real-time data associated with a field of data within a schema of the data source to provide a user interface of executing the application while the application is developed.

2. The system of claim 1, wherein the selected authorized microservice is cloud-based.

3. The system of claim 1, wherein communication with the resource provider is based upon a Representational State Transfer based Application Programming Interface.

4. The system of claim 3, wherein the Application Programming Interface is based on Hypertext Transfer Protocol (HTTP).

5. The system of claim 3, wherein the Application Programming Interface is based on Simple Object Access Protocol (SOAP).

6. The system of claim 1, wherein the identified authorized microservice is identified as authorized based upon a token presented in the request.

7. The system of claim 6, wherein the token is a role-based access control web token utilizing a JavaScript Object Notation (JSON).

8. The system of claim 1, the application is created without a user writing code.

9. The system of claim 1, wherein the metadata further comprises a sharing attribute.

10. The system of claim 9, wherein the sharing attribute is indicative of whether the application is sharable across a tenant boundary with a different tenant of a cloud-based provider.

11. A method, comprising:
    providing information regarding one or more authorized microservices for which a user is authorized;
    using a Representational State Transfer based Application Programming Interface, receiving information regarding selection by the user of one or more of selected authorized microservices of the one or more of authorized microservices for which the user is authorized;
    providing information regarding data associated with the one or more selected authorized microservices, the one or more selected authorized microservices associated with a data source, the data associated with a field of data within a schema of the data source; and
    storing information regarding the one or more selected authorized microservices as an application along with metadata describing the one or more selected authorized microservices to provide a user interface of executing the application while the application is developed.

12. The method of claim 11, wherein the data is real-time data associated with a particular data source.

13. The method of claim 11, further comprising:
authenticating the user, the user having role-based access authorized control to the one or more authorized microservices.

14. The method of claim 11, further comprising using a Representational State Transfer based Application Programming Interface, receiving logic for transforming data for the application.

15. The method of claim 11, further comprising using a Representational State Transfer based Application Programming Interface, receiving a visual for the application.

16. The method of claim 11, further comprising using a Representational State Transfer based Application Programming Interface, receiving information regarding sharing of the application.

17. A method, comprising:
using a Representational State Transfer based Application Programming Interface, receiving a request for gallery items;
identifying identified authorized applications associated with the request;
providing information regarding the identified authorized applications;
using a Representational State Transfer based Application Programming Interface, receiving selection of a particular identified authorized application of the identified authorized applications; and
providing a package of the particular identified authorized application to provide a user interface of executing the particular identified authorized application while the particular identified authorized application is developed.

18. The method of claim 17, wherein the package is a file comprising HyperText Markup Language.

19. The method of claim 17, wherein the package is a file comprising JavaScript.

20. The method of claim 17, wherein identifying authorized applications associated with the request is based on a token received with the request.

* * * * *